US009464159B2

(12) United States Patent
Rashid et al.

(10) Patent No.: US 9,464,159 B2
(45) Date of Patent: Oct. 11, 2016

(54) POLYMERS FOR CONTACT LENSES

(75) Inventors: Abdul Rashid, Bellshill (GB);
Roderick William Jonathan Bowers,
Bellshill (GB); Wade Tipton, Bellshill
(GB); Neil Bonnette Graham, Bellshill
(GB)

(73) Assignee: OCUTEC LIMITED, Bellshill (GB)

( * ) Notice: Subject to any disclaimer, the term of this
patent is extended or adjusted under 35
U.S.C. 154(b) by 0 days.

(21) Appl. No.: 13/505,410

(22) PCT Filed: Nov. 2, 2010

(86) PCT No.: PCT/GB2010/002019
§ 371 (c)(1),
(2), (4) Date: Aug. 10, 2012

(87) PCT Pub. No.: WO2011/051690
PCT Pub. Date: May 5, 2011

(65) Prior Publication Data
US 2013/0053511 A1    Feb. 28, 2013

(30) Foreign Application Priority Data

Nov. 2, 2009 (GB) .................................. 0919166.9
Nov. 2, 2009 (GB) .................................. 0919167.7

(51) Int. Cl.
*C08L 75/06* (2006.01)
*C08G 77/26* (2006.01)
*C08L 83/08* (2006.01)
*C08G 18/34* (2006.01)
*C08G 18/61* (2006.01)
*C08G 18/48* (2006.01)
*G02B 1/04* (2006.01)

(52) U.S. Cl.
CPC ............ *C08G 18/61* (2013.01); *C08G 18/4829*
(2013.01); *C08G 18/4833* (2013.01); *C08G 18/4883* (2013.01); *G02B 1/043* (2013.01);
*C08G 2210/00* (2013.01)

(58) Field of Classification Search
None
See application file for complete search history.

(56) References Cited

U.S. PATENT DOCUMENTS

| 3,939,123 A | 2/1976 | Matthews et al. | |
| 4,242,490 A | 12/1980 | Emerson et al. | |
| 4,485,227 A | 11/1984 | Fox | |
| 4,644,033 A | 2/1987 | Gnanou et al. | 524/590 |
| 4,780,512 A | 10/1988 | Gould et al. | |
| 4,810,582 A | 3/1989 | Gould et al. | |
| 4,886,700 A | 12/1989 | Younes | |
| 4,886,866 A | 12/1989 | Braatz et al. | 528/59 |
| 4,929,706 A | 5/1990 | Heifetz et al. | |
| 5,039,458 A * | 8/1991 | Braatz et al. | 264/2.6 |
| 5,112,874 A | 5/1992 | Schlak et al. | |
| 5,120,816 A | 6/1992 | Gould et al. | |
| 5,648,402 A * | 7/1997 | Nunez et al. | 523/107 |
| 6,012,471 A | 1/2000 | Calvin et al. | |
| 6,673,273 B2 | 1/2004 | Ba Le et al. | |
| 6,822,016 B2 * | 11/2004 | McCabe et al. | 523/107 |
| 6,930,196 B2 | 8/2005 | Carlson | |
| 6,995,192 B2 | 2/2006 | Phelan et al. | 522/90 |
| 2002/0032297 A1 | 3/2002 | Carlson et al. | |
| 2002/0153623 A1 | 10/2002 | Gobron et al. | |
| 2003/0069383 A1 | 4/2003 | Van Antwerp et al. | |
| 2004/0018300 A1 | 1/2004 | Baillet et al. | 427/162 |
| 2006/0006558 A1 | 1/2006 | Yamada | |
| 2007/0105973 A1* | 5/2007 | Nicolson et al. | 523/106 |
| 2007/0296094 A1 | 12/2007 | Jiang et al. | |
| 2008/0281013 A1 | 11/2008 | Nakamura et al. | |
| 2009/0010986 A1 | 1/2009 | Ashton et al. | 424/422 |

FOREIGN PATENT DOCUMENTS

| DE | 102007020985 A1 | 11/2007 |
| DE | 10 2008 023798 A1 | 11/2009 |
| EP | 0117768 B1 | 12/1986 |
| EP | 0356862 A2 | 8/1989 |
| EP | 0350890 A2 | 1/1990 |
| EP | 1251146 A1 | 4/2002 |
| EP | 2270551 A2 | 1/2011 |
| FR | 2674529 A1 | 10/1992 |
| WO | 01/24839 A1 | 4/2001 |
| WO | 02/00749 A2 | 1/2002 |
| WO | 02/081183 A | 10/2002 |
| WO | 2004/020495 | 3/2004 |
| WO | 2006/010612 A1 | 2/2006 |
| WO | 2006/064085 A2 | 6/2006 |

OTHER PUBLICATIONS

Non-Final Office Action on U.S. Appl. No. 14/621,316 mailed Dec. 24, 2015.

* cited by examiner

*Primary Examiner* — Jeffrey Washville
(74) *Attorney, Agent, or Firm* — Foley & Lardner LLP

(57) ABSTRACT

The present invention relates to a polyurethane polymer prepared from a mixture comprising: (a) at least one polyol of formula (I), wherein at least three of $X_1$, $X_2$, $X_3$, $X_4$ and $X_5$ are each independently an OH-terminated polyoxyalkylene group, and the remainder of $X_1$, $X_2$, $X_3$, $X_4$ and $X_5$ are each independently H or absent, and Z is a central linking unit; (b) at least one di- or poly-isocyanate; and (c) optionally at least one OH-terminated chain extender. Further aspects of the invention relate to a process for preparing a polyurethane, and to a process for preparing a contact lens.

21 Claims, No Drawings

POLYMERS FOR CONTACT LENSES

CROSS REFERENCE TO RELATED APPLICATIONS

This application is a U.S. national phase application under 35 U.S.C. §371 of International Application No. PCT/GB2010/002019, filed on Nov. 2, 2010, which claims priority to and the benefit of United Kingdom Patent Application No. 0919166.9 filed on Nov. 2, 2009, and United Kingdom Patent Application No. 0919167.7 filed on Nov. 2, 2009. The entire disclosures of each of the above-identified patent applications are incorporated by reference herein.

The present invention relates to polyurethane-based polymers that have applications in the field of contact lens technology. The invention also relates to a process for preparing such materials.

BACKGROUND TO THE INVENTION

Soft contact lenses offer a viable alternative to spectacles for the correction of visual defects such as myopia, hypermetropia and astigmatism. Early lenses were manufactured from polymers based on 2-hydroxyethyl methacrylate, (HEMA). Although these lenses provided some comfort but did not provide sufficient oxygen permeability to prevent problems associated with corneal hypoxia. Attempts to address this problem included copolymerising HEMA with hydrophilic monomers such as methacrylic acid and N-vinyl pyrrolidone. Although these polymers increased the level of oxygen permeability, the incorporation of these comonomers also leads to problems such as protein and lipid deposition, corneal desiccation, staining and lens dehydration.

More recently, a new generation of polymers has been developed to further increase the level of oxygen. These materials are based on the copolymerisation of silicone methacylates with hydrophilic comonomers. The lenses produced from these materials were originally designed for extended wear. Though daily wear products also exist now. Although successful in further increasing DK, these new materials still suffer from limitations such as lipid binding and dryness, all of which decrease lens on eye comfort.

There is therefore still a need for new contact lens polymers, which offer sufficient oxygen levels for normal corneal metabolism during daily wear, and which provide a high level of comfort throughout the day.

One class of polymers which holds considerable promise for novel contact lens materials are PEG based polyurethanes.

Urethane chemistries have also been widely investigated in the field of biomedical devices. For example, U.S. Pat. No. 3,786,034 discloses hard, hydrophilic polyurethane materials formed from reacting a specific polyol with a polyfunctional isocyanate. U.S. Pat. No. 3,821,186 teaches similar such materials. Likewise, U.S. Pat. No. 4,136,250 teaches a polymer formed by reacting a high molecular weight polydimethyl siloxane diol with 2 mole equivalents of isophorone di-isocyanate and then reacting with excess hydroxyl-containing monomers. Further urethane copolymers are disclosed in U.S. Pat. No. 4,454,309 and U.S. Pat. No. 4,359,553.

U.S. Pat. No. 6,930,196 discloses polyurethane hydrogel contact lenses prepared from prepolymers made by reacting (a) at least one multifunctional compound; (b) at least one di-isocyanate; and (c) at least one diol. The prepolymers so formed are then reacted with excess water to form a hydrogel polymer suitable for use as a contact lens.

U.S. Pat. No. 4,644,033 discloses a polyurethane hydrogel formed from the reaction of a polyoxyethylene and a polyfunctional isocyanate in a non-aqueous solvent. The materials can be molded into contact lenses.

U.S. Pat. No. 5,932,200 discloses a polyurethane formed from reacting a diol component and an organic di-isocyanate with critical selection of the amount of water in the reaction mixture and the diol component. The polyurethane is in the form of a gel that has applications in burn/wound care dressings and as surgical implants.

U.S. Pat. No. 4,885,966 and U.S. Pat. No. 5,175,229 disclose hydrophilic polymeric soft contact lenses prepared from prepolymers that are isocyanate-capped oxyethylene-based diols or polyols having a molecular weight of about 7000 to 30,000, wherein essentially all of the OH groups are capped with polyisocyanate. The prepolymers are hydrated to form polyurea-polyurethane polymers that are characterised by having a non-ionic surface which is resistant to non-specific protein adsorption.

The use of silicone-containing polymers has led to contact lenses exhibiting much higher oxygen permeabilities. However, the incorporation of silicone can lead to other adverse performance characteristics, such as surface wettability problems.

Silicone-containing materials suitable for contact lens technology are described in U.S. Pat. No. 6,312,706, which discloses a hydrogel material that is the polymerisation product of a comonomer mixture comprising (a) a polysiloxane-containing urethane prepolymer end-capped with polymerizable ethylenically unsaturated organic radicals, (b) tris-(trimethylsiloxy)silyl propyl methacrylate and (c) a hydrophilic comonomer.

U.S. Pat. No. 4,136,250 teaches polymers formed from mono-olefinic monomers cross-linked with a major amount of a di- or tri-olefinic polysiloxane based macromer having a molecular weight between 400 and about 600.

U.S. Pat. No. 4,962,178 discloses siloxane-urethane polymers suitable for use as oxygen permeable membranes or ophthalmic devices, having based on total urethane groups 50-80% of —C—NH—COO—C— groups and 50-20% of —C—NH—COO—Si-groups, which consists essentially of the polymerisation product of (a) 80-95% weight of a poly-isocyanate capped, linear or branched polysiloxane prepolymer and (b) 20-50% by weight of a linear polydialkyl or polydiphenyl-siloxane disilanol having terminal siloxanol groups.

U.S. Pat. No. 4,983,702 discloses a cross-linked siloxane-urethane polymer in the form of an ophthalmic device, which consists essentially of the reaction product of (a) a di orpoly-hydroxyalkyl substituted alkyl polysiloxane and (b) an aliphatic, cycloaliphatic or atomatic di- or tri-isocyanate, wherein the total number of hydroxyol groups in component (a) is stoichiometrically equivalent to the total number of isocyanate groups in component (b), and with the proviso that an effective cross-linking amount of (a) or (b) is present and possesses a functionality of greater than two.

U.S. Pat. No. 4,711,943 discloses a non-fibrous polymeric contact lens material having improved oxygen permeability and stability, said material comprising a monomer having a first portion for increasing wettability which is hydrophilic and includes a side chain functionality selected from —CO—N— or —O—CO—N— (such as an acrylamide), and a second portion for increasing oxygen permeability, said second portion including a siloxane. The resulting materials have a water content of about 15-60%, DK greater than or equal to about 25×10⁻¹⁰, tear strength greater than or equal to about 1.0 g/mm², and percent elongation greater than or about equal to about 80%.

The present invention seeks to provide new polyoxyethylene based polyurethane materials that are suitable for use in the contact lens industry. Ideally, the polyoxyethylene based polyurethane materials of the invention exhibit exemplary physical properties, for example, in terms of modulus, oxygen permeability, light transmissibility, surface wettability and wearer comfort over extended periods. According to one embodiment, the present invention seeks to provide new silicone-containing polyoxyethylene based polyurethane materials, suitable for use in the contact lens industry.

STATEMENT OF INVENTION

A first aspect of the invention relates to a polymer prepared by reacting a mixture comprising:
(a) at least one polyol of formula I,

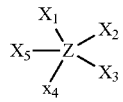

wherein at least three of $X_1$, $X_2$, $X_3$, $X_4$ and $X_5$ are each independently an OH-terminated polyoxyalkylene group, and the remainder of $X_1$, $X_2$, $X_3$, $X_4$ and $X_5$ are each independently H or absent, and Z is a central linking unit;
(b) at least one di- or poly-isocyanate; and
(c) optionally at least one OH-terminated chain extender.

According to one embodiment, the mixture may comprise at least one polydialkyl siloxane diol, which may comprise one or two terminal carbinol groups. The polydialkyl siloxane diol may be a silicone macromer (defined below). Alternatively, the polyol may comprise silicon, in particular Z may comprise silicon.

A second aspect of the invention relates to a process for preparing a polyurethane hydrogel, said process comprising:
(i) preparing a mixture comprising at least one polyol of formula I,

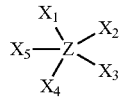

wherein at least three of $X_1$, $X_2$, $X_3$, $X_4$ and $X_5$ are each independently an an OH-terminated polyoxyalkylene group, and the remainder of $X_1$, $X_2$, $X_3$, $X_4$ and $X_5$ are each independently H or absent, and Z is a central linking unit;
at least one di- or poly-isocyanate and optionally at least one OH-terminated chain extender;
(ii) curing the mixture formed in step (i) directly to form a polyurethane xerogel;
(iii) hydrating the xerogel using an aqueous medium to form a hydrogel.

According to one embodiment, the mixture may comprise at least one polydialkyl siloxane diol (silicone macromer). Alternatively, the polyol may comprise silicon, in particular Z may comprise silicon.

A third aspect of the invention relates to a polymer obtainable by the above described process.

A fourth aspect of the invention relates to a process for preparing a contact lens, said process comprising the steps of:
(i) preparing a reaction mixture comprising at least one polyol of formula I,

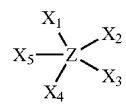

wherein at least three of $X_1$, $X_2$, $X_3$, $X_4$ and $X_5$ are each independently an OH-terminated polyoxyalkylene group, and the remainder of $X_1$, $X_2$, $X_3$, $X_4$ and $X_5$ are each independently H or absent, and Z is a central linking unit;
at least one di- or poly-isocyanate and optionally at least one OH-terminated chain extender;
(ii) dispensing the reaction mixture formed in step (i) into a contact lens mold;
(iii) allowing the reaction mixture to cure;
(iv) removing the contact lens from the mold; and
(v) hydrating the contact lens.

According to one embodiment, the reaction mixture may comprise at least one polydialkyl siloxane diol (silicone macromer). Alternatively, the polyol may comprise silicon, in particular Z may comprise silicon.

A fifth aspect of the invention relates to an article of manufacture comprising a polymer as described above.

A sixth aspect of the invention relates to the use of a polymer as described above in the preparation of a contact lens.

DEFINITIONS

"DK" is a measure of the oxygen permeability of a material provided in Barrer units where 1 Barrer=10⁻¹¹ cm²·mL·mmHg.

The term "hydrogel" is used herein to refer to a polymer comprising 10 wt % or more water. A hydrogel in an aqueous medium will absorb water and retain its original dry shape but it will be enlarged. It will not dissolve in water to form a fluid solution unless it is significantly degraded.

The term "xerogel" is used herein to refer to a polymeric material which may form a hydrogel upon contact with sufficient water. Generally a xerogel is dry and comprises less than 5 wt % water.

The term "substantially anhydrous" is used herein to refer to conditions in which the amount of water is sufficiently low so as to produce a polyurethane backbone that is substantially free from urea groups. Preferably the amount of water in the reactant mixture is less than about 0.3 wt. %, more preferably less than about 0.1 wt. %, even more preferably less than about 0.05 wt. %.

As used herein the term "polyol" refers to a compound having more than 2 available hydroxyl groups and are generally of molecular weight less than or equal to 1000.

The term "macropolyol" is used herein to refer to a compound having more than 2 available hydroxyl groups linked to a macromer, As used herein, the term "macromer" (also referred to as "macromonomer") refers to a polymer or oligomer that has a functional group capable of participating in further polymerisation.

The "functionality" of a compound is used to refer to the number of functional groups that are capable of reacting in the reaction mixture. As such, "pentafunctional" is used to refer to a compound having five functional groups capable of reacting in the reaction mixture, "tetrafunctional" is used to refer to a compound having four functional groups capable of reacting in the reaction mixture, etc.

The term "carbinol" is used to refer to a hydroxyl functional group attached to a carbon atom. The carbon atom may be attached to a carbon atom (in particular a carbon atom forming part of a hydrocarbon group), a non-carbon atom including Si, N and O.

The term "small alkyl group" refers to an alkyl group having a carbon backbone of 1 to 6 carbon atoms, typically 1 to 4 carbon atoms.

The term "Silicone Macromer" is used herein to refer to a polydialkyl siloxane diol having at least one functional group capable of participating in polymerization. The silicone macromer typically comprises at least one terminal carbinol group, generally two terminal carbinol groups. The silicone macromer may have the structure of a dihydroxy terminated block copolymer oxyethylene-dimethylsiloxane-oxyethylene (see, for instance, formula V described in this document); oxypropylene-dimethylsiloxane-oxypropylene or caprolactone-dimethylsiloxane-caprolactone of different molecular weights containing different weight % of non-siloxane units. Some such compounds are also available commercially e.g., Gelest Inc. supplies compounds like DMS-C15 having a molecular weight of around 1000 and a non-siloxane content of around 20 wt %, DBE-C25 having a molecular weight of around 3500-4500 and a non-siloxane content of around 60 wt %, DBP-C22 having a molecular weight of around 2500-3200 and a non-siloxane content of around 45-55 wt %, DBL-31 having a molecular weight of around 5700-6900 and a non-siloxane content of around 50 wt %.

DETAILED DESCRIPTION

Polymer Composition

A first aspect of the invention relates to a polymer composition as described above, in particular that is useful in the preparation of a contact lens. The polymer composition is prepared by reacting a polyol as described above with at least one di- or poly-isocyanate and at least one OH-terminated chain extender. According to one embodiment, at least one polydialkyl siloxane diol is also reacted. Alternatively, the polyol may comprise silicon, in particular Z may comprise silicon.

Polyol

The present invention involves the use of at least one polyol of formula I,

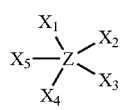

I wherein at least three of $X_1$, $X_2$, $X_3$, $X_4$ and $X_5$ (i.e. three, four or five) are each independently an OH-terminated polyoxyalkylene group, and the remainder of $X_1$, $X_2$, $X_3$, $X_4$ and $X_5$ are each independently H or absent, and Z is a central linking unit.

The polyol of formula I is preferably a macropolyol. As used herein, the term "macropolyol" refers to a macromer bearing multiple OH functionalities. Typically, the macropolyol has a molecular weight greater than 500, generally greater than 1000.

As used herein, the term "macromer" (also referred to as "macromonomer") refers to a polymer or oligomer that has functional groups capable of participating in further polymerisation.

Preferably, the polyoxyalkylene groups are polymers and/or co polymers of ethylene oxide and/or propylene oxide in which the terminal hydroxyl groups maybe primary or secondary hydroxyls, or a mixture thereof. More preferably, the polyoxyalkylene groups are OH— terminated polyoxyalkylene groups selected from polyoxyethylene and polyoxypropylene units, or a mixture thereof.

The polyol of formula I can be derived from various multi hydroxy compounds e.g. a polyol comprising three polyoxyalkylene groups can be derived from trimethyol propane, a polyol comprising four polyoxyalkylene groups can be derived from pentaerythritol, and a polyol comprising five polyoxyalkylene groups can be derived from pentanepentols and/or from sugar molecules bearing at least five hydroxy groups.

In one preferred embodiment, Z is a pentafunctional central linking unit and each of $X_1$, $X_2$, $X_3$, $X_4$ and $X_5$ is independently an OH-terminated polyoxyalkylene group.

In one preferred embodiment, Z is a tetrafunctional central linking unit, each of $X_1$, $X_2$, and $X_3$, and $X_4$ is independently an OH-terminated polyoxyalkylene group and $X_5$ is absent.

In one preferred embodiment, Z is a trifunctional central linking unit, each of $X_1$, $X_2$ and $X_3$ is independently an OH-terminated polyoxyalkylene group, and $X_4$ and $X_5$ are absent.

In one preferred embodiment, the polyol is a macropolyol of formula Ia,

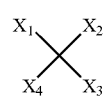

Ia wherein each of $X_1$, $X_2$ and $X_3$ is independently an OH-terminated polyoxyalkylene group;

and $X_4$ is H or as defined for $X_1$, $X_2$ and $X_3$.

In one preferred embodiment, the polyol is of formula Ia, each of $X_1$, $X_2$ and $X_3$ is independently an OH-terminated polyoxyalkylene group and $X_4$ is H.

In another preferred embodiment, the polyol is of formula Ia, each of $X_1$, $X_2$ and $X_3$ and $X_4$ is independently an OH-terminated polyoxyalkylene group.

In one highly preferred embodiment, Z is derived from 1,2,3,4,5-pentanepentol,

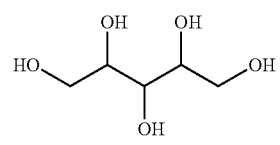

1, 2, 3, 4, 5-Pentanepentol wherein 3, 4, or 5 of the OH groups are each independently substituted by a polyoxyalkylene group.

In one highly preferred embodiment, the polyol is of formula II,

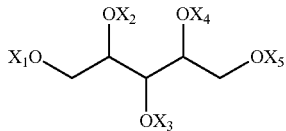

wherein $X_1$, $X_2$, $X_3$, $X_4$ and $X_5$ are each independently a polyoxyalkylene group. In one highly preferred embodiment, Z is derived from pentaerythritol,

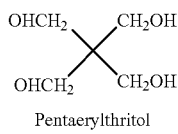

Pentaerylthritol i.e. the polyol is derived from pentaerythritol wherein 3 or 4 of the OH groups are independently substituted by a polyoxyalkylene group.

In another preferred embodiment, the polyol is of formula Ib,

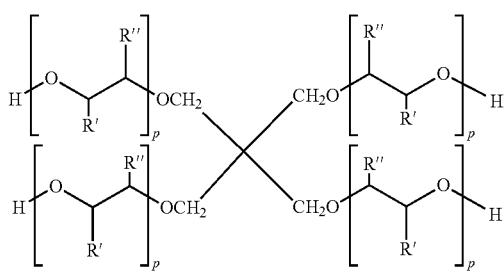

wherein each p is from about 3 to about 25 and R' and R" are each independently H or alkyl. More preferably, p is about 25.

In another particularly preferred embodiment, the macropolyol is of formula Ic,

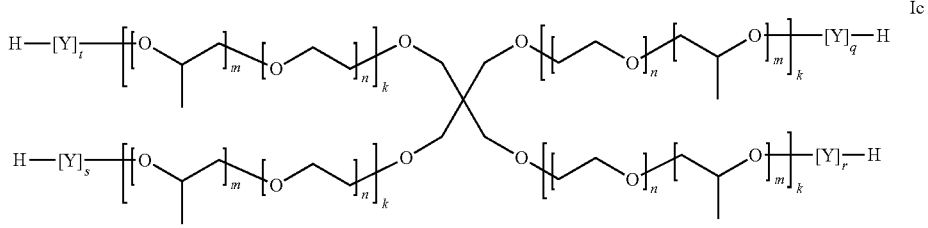

wherein Y is the group —$CH_2$—$CH(R')$—O—, R' is H or $CH_3$, n is an integer from 0 to 20, m is an integer from 0 to 6, k is an integer from 3 to 25 and each of q, r, s and t is independently an integer from 1 to 25. More preferably, n is 4, m is 0 and k is 5 and R' is $CH_3$, q, r, s and t are 1. The terminal groups in these polyols may be either primary or secondary hydroxyl groups.

Preferably, the polyol is a fluid at ambient temperatures.

Preferably, the macropolyol has a molecular weight of from about 500 to about 20,000, typically from about 500 to about 15,000, suitably from about 1000 to about 15,000.

In one highly preferred embodiment, the macropolyol is an ethylene oxide/propylene oxide copolymerisate, typically having a tetrahydroxy functionality. According to one embodiment, the macropolyol has the structure: $H(OCH_2CH_2)_n(OCH_2CHCH_3)_mOH$ where n:m is around 4:1.

Such ethylene oxide/propylene oxide copolymerisates are available from Clariant under reference P41, in particular P41/200, P41/300, P41/3000 and P41/12000 may be used.

Various grades of P41/300 are commercially available and can be used to afford the material of the present invention. P41/300 has a molecular weight of ~5000, P41/3000 has a molecular weight of ~15,000, whereas P41/12000 has a molecular weight of ~20,000.

Advantageously, the use of macropolyols of the invention (particularly those of Formula 1b, especially P41/300, P41/3000 or P41/12000 and related compounds) gives rise to a liquid reaction mixture in which all the reaction components and additives are maintained in the fluid state for subsequent dispensing into molds at the ambient temperature, thereby allowing the reaction and curing to take place. The curing step may take place with or without additional heating.

Preferably, the polyol is used in an amount from about 10 to about 95 wt % of the reactants, more preferably from about 30 to about 70 wt % of the reactants.

The macropolyol used in the compositions of the invention is preferably a tetrafunctional hydroxyl terminated macromolecule (e.g. of formula Ia, Ib or Ic). Preferably, the terminal OH groups are secondary hydroxyls (e.g. derived from propylene oxide unit, such as compounds of formula Ic wherein m is greater than zero) that react with isocyanate groups (e.g. Desmodur W). The reactivity ratio of the secondary hydroxyl groups is generally lower than primary hydroxyls (e.g. in TEG).

According to one embodiment, the polyol may comprise silicon, in particular Z may comprise silicon. Typically the polyol is a polydialkyl siloxane diol, generally comprising at least one terminal carbinol group, suitably all of the hydroxyl functional groups are in the form of terminal carbinol groups.

According to one embodiment, the polyol may have the structure of Formula VII:

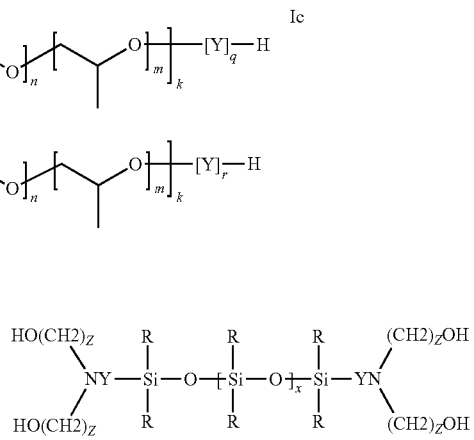

where R represents a small alkyl group, typically methyl, x is an integer from 1 to 324, Y is an alkyl group (generally having a carbon backbone of 1 to 25 carbon atoms, typically 1 to 6 carbon atoms), Z is an integer from 1 to 25 (generally 1 to 5, typically 2).

Chain Extender

The polymer composition of the invention is preferably prepared using at least one OH-terminated chain extender.

Preferably, the chain extender is a di-functional chain extender comprising two hydroxyl groups which maybe either primary or secondary hydroxyls.

Preferably, the number average molecular weight of the difunctional chain extender is less than or equal to 1000.

In one preferred embodiment, the chain extender is selected from polyethylene glycols and/or polypropylene glycols or glycols comprising copolymers of ethylene oxide and propylene oxide.

Preferred chain extenders for use in the present invention include triethylene glycol, 1,4-butanediol, tetraethylene glycol, diethylene glycol, triethylene glycol (TEG) ethylene glycol, hexanediol, propylene glycol, 2-ethylhexanediol-1,6, neopentyl glycol hydroquinone bis(2-hydroxyethyl)ether, dipropylene glycol, 2-methyl-2-ethyl-1,3propanediol, 2-ethyl-1,3-hexanediol, 1,5-pentanediol, thiodiglycol, 1,3-propanediol, 1,3butanediol, 2,3-butanediol, 1,2-dimethyl-1, 2-cyclopentanediol, 1,2-cyclohexanediol, 1,2-dimethyl-1,2-cyclohexanediol, butanetriol, 3 Methyl 1,5 pentanediol, aromatic-aliphatic glycols such as bis-1,4(β-hydroxyethoxy) benzene, and polymers of ethylene oxide and copolymers of ethylene oxide with propylene oxide having a number average of less than or equal to 1000 may also be employed In one highly preferred embodiment, the chain extender is TEG (triethylene glycol).

Preferably, the chain extender (e.g. TEG) is used an amount of from 0 to about 35 wt % of the reactants, more preferably from about 10 to about 25 wt % of the reactants.

The proportion/concentration of the chain extender within a given composition can also affect the material properties. The chain extender (e.g. TEG) reacts with NCO groups (e.g. Desmodur W) to form the "hard" blocks within the resultant polymer matrix that affords the strength (tensile properties) to the material. The skilled person would thus appreciate that the concentration of the given chain extender can be adjusted in order to fine tune the tensile properties of the resulting material.

Di- or Poly-Isocyanate

The polymer composition of the invention is prepared using at least one di- or poly-isocyanate. Preferably, the di- or poly-isocyanate is an organic di- or poly-isocyanate.

The di- or poly-isocyanate performs a number of different functions. Firstly, it acts as a coupling agent for the macropolyol component to produce the soft segment.

Secondly, it acts as a coupling agent for the chain extender component to produce urethane-rich hard segments. Thirdly, it acts as a coupling agent for the soft and hard segments to build up the molecular weight of the resulting polymer.

Suitable poly-isocyanates for use in the compositions of the present invention include, trifunctional trimer (isocyanurate) of isophorone diisocyanate, trifunctional trimer (isocyanurate) of hexamethylene diisocyanate and polymeric 4,4'-diphenylmethane diisocyanate.

More preferably, the di- or polyisocyanate is aliphatic.

Preferably, the di- or polyisocyanate is liquid at ambient temperature.

In one preferred embodiment, the polymer composition of the invention is prepared using at least one di-isocyanate.

Preferably, the di-isocyanate is of the formula OCN—R$_1$—NCO, wherein R$_1$ is a linear or branched C$_3$-C$_{18}$-alkylene, an unsubstituted or C$_1$-C$_4$-alkyl-substituted or C$_1$-C$_4$-alkoxysubstituted C$_6$-C$_{10}$-arylene, a C$_7$-C$_{18}$-aralkylene, a C$_6$-C$_{10}$-arylene-C$_1$-C$_2$-alkylene-C$_6$-C$_{10}$-arylene, a C$_3$-C$_8$-cycloalkylene, a C$_3$-C$_8$-cycloalkylene-C$_1$-C$_6$-alkylene, a C$_3$-C$_8$-cycloalkylene-C$_1$-C$_6$-alkylene-C$_3$-C$_8$-cycloalkylene or a C$_1$-C$_6$-alkylene-C$_3$-C$_8$-cycloalkylene-C$_1$-C$_6$-alkylene.

Examples of particularly preferred diisocyanates include methylene dicyclohexyl diisocyanate, hexamethylene diisocyanate, isophorone diisocyanate, toluene-2,4-diisocyanate, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 4,4"-biphenylene diisocyanate, 3,3"-dichloro-4,4"-biphenylene diisocyanate, 1,6-hexamethylene diisocyanate, 1,4-tetramethylene diisocyanate, 1,10decamethylene diisocyanate, cumene-2,4-diisocyanate, 1,5-napthalene diisocyanate, 1,4-cyclohexylene diisocyanate, 2,5-fluorene-diisocyanate, polymeric 4,4' diphenylmethane diisocyanate.

The diisocyanate is preferably an aliphatic diisocyanate. Aliphatic diisocynates which are fluid at ambient temperatures are particularly preferred, In one highly preferred embodiment, the di-isocyanate is Desmodur W (methylene bis(4-cyclohexyl isocyanate), MW=262.5).

Preferably, the di- or poly-isocyanate is used in an amount of from about 9 wt % to about 50 wt %, more preferably from about 20 wt % to about 35 wt %. The amount of di- or poly-isocyanate in any given composition can be adjusted to modify the relevant contact lens properties/attributes.

The stoichiometery (OH/NCO ratio) of the reacting mixture plays an important part in determining the extent of cross-linking. For example, the cross-link density, and hence the molecular weight/modulus of the material, is expected to be relatively higher for a 1:1 NCO:OH stoichiometry, and such a material is also expected to afford relatively lower water content on hydration than the polymer afforded by a composition that has a non stoichiometric ratio (e.g. OH groups>NCO groups). The skilled person would thus appreciate that the NCO:OH stoichiometry can be adjusted so as to obtain a material with the desired modulus and to some degree water content.

In one particularly preferred embodiment, the polyol and the di- or poly-isocyanates are employed in such proportions as to provide an overall OH/NCO ratio in the range of from OH/NCO 2.0:2.8-2.0:1.1, more preferably, 2.0:1.7.

In one preferred embodiment, the polyol, chain extender and di- or polyisocyanate are reacted in the presence of a catalyst. Preferably, the catalyst is a transition metal compound typically used for speeding up the reaction of isocyanates with polyols and used in the manufacture of polyurethanes. Examples include, but are not limited to, transition metal catalysts such as tin, zinc, bismuth and zirconium catalysts. The catalyst may also be an amine or polyamine. Particularly preferred catalysts include dibutyltin dilaurate, FeCl$_3$, stannous octoate, tertiary amines such as triethylamine and the like. In one highly preferred embodiment, the catalyst is dibutyl tin dilaurate (DBTDL).

Preferably, the catalyst is used in an amount of from about 0.02 wt % to about 1.0 wt % of the reactants, more preferably, from about 0.05 wt % to about 0.5 wt %, even more preferably, from about 0.05 wt % to about 0.2 wt %, of the reactants.

Preferably, the reaction mixture is in the form of a dry mixture, i.e. the mixture is substantially anhydrous and substantially excludes water. Preferably, the components of the reaction mixture are liquid at ambient temperature.

The reaction of the invention proceeds with the di- or poly-isocyanate reacting randomly with the macropolyol and chain extender to eventually form a cross-linked polymer matrix. Advantageously, the resulting polymer matrix allows high flux of oxygen, resulting in an elevated DK lens.

Additional Components

In one preferred embodiment, the composition further comprises one or more antioxidants. Suitable antioxidants include BHA (butylated hydroxyl anisole), BHT (butylated hydroxytoluene) and ascorbic acid. Preferably, the antioxidant is BHA.

Preferably, the antioxidant is used in an amount of about 0.01 to about 3.0 wt % of the reactants, more preferably from about 0.02 to about 2.0 wt %, even more preferably from about 0.05 to about 1.0 wt %, more preferably still, from about 0.05 to about 0.5 wt % of the reactants.

According to one embodiment of the present invention, the antioxidant is present at an amount of about 1.0 to about 3.0 wt % of the reactants.

In one preferred embodiment of the invention, the composition further comprises one or more additional components such as a modulus modifier, plasticizer, humectant, lubricant, process aid, viscosity reducer, compatibility enhancer and/or polymer matrix structure modifier. Preferably, the additional component is present in an amount of 0 to about 20 wt %, more preferably from about 2.5 to about 10 wt %, more preferably still, about 4 to about 6 wt % of the reactants.

Suitable modulus modifiers include components that alter the modulus property of the polyurethane and may also alter the oxygen permeability property. Preferred modulus modifiers include tertiary butyl styrene, a cycloalkyl modulus modifier (for example, as described in U.S. Pat. No. 4,327,203) or a polycyclic modulus modifier.

In one particularly preferred embodiment, the additional component is poly(ethylene glycol) dimethyl ether (PEG DME), which can act as a modulus modifier, plasticizer, humectant/lubricant, process aid, viscosity reducer, compatibility enhancer and polymer matrix structure modifier. PEG DMEs of various molecular weights (e.g. 250, 500, 1000, 2000) are commercially available and are suitable for use in the present invention. Preferably, for the purposes of the present invention, the PEG DME has a molecular weight of 250 (e.g. PEG DME-250). As an alternative, polyethylene glycol dibutyl ether can also be used.

Advantageously, the incorporation of PEG DME into the polymer compositions of the invention leads to lenses having a reduced modulus. Preferably, the modulus of lenses prepared from the polymer compositions of the invention is from about 0.1 to about 0.8 MPa, more preferably, about 0.3 to about 0.5 MPa.

In one preferred embodiment, the composition of the invention further comprises one or more tinting agents. By way of example, suitable tinting agents commonly used in the contact lens industry include the following: benzene sulfonic acid, 4-(4,5-dihydro-4((2-methoxy-5-methyl-4-((2-(sulfooxy)ethyl)sulfonyl)phenyl)azo-3-methyl-5-oxo-1Hpyrazol-1-yl); [2-naphthalene-sulfonic acid, 7-(acetylamino)-4-hydroxyl-3-((4-((sulfooxyethyl)sulfonyl)phenyl)azo)-]; [5-((4,6-dichloro-1,3,5-triazin-2-yl)amino-4-hydroxy-3((1-sulfo-2-naphthalenyl)azo-2,7-naphthalene-disulfonic acid, trisodium salt]; [copper, 29H, 31H-phthalocyaninato(2-)-$N_{29}$, $N_{30}$, $N_{31}$, $N_{32}$)—, sulfo((4((2-sulfooxy)ethyl)sulfonyl)phenyl)amino) sulfonyl derivative]; and [2,7-naphthalenesulfonic acid, 4-amino-5hydroxy-3,6-bis((4-((2-(sulfooxy)ethyl)sulfonyl)phenyl)azo)-tetrasodium salt].

Particularly preferred tinting agents for use in the present invention are phthalocyanine pigments such as phthalocyanine blue and phthalocyanine green, chromic-aluminacobaltous oxide, chromium oxides, and various iron oxides for red, yellow, brown and black colours, chromophtal violet and chromophtal oxide green. The use of organic pigments, particularly phthalocyanine pigments, more particularly copper phthalocyanine pigments, and even more particularly copper phthalocyanine blue pigment (e.g., Colour Index Pigment Blue 15, Constitution No. 74160) is preferred. Opaquing agents such as titanium dioxide may also be incorporated. For certain applications, a mixture of colours may be employed for better simulation of natural iris appearance.

In one preferred embodiment, the tinting agent is a handling tint such as Reactive Blue 4.

Preferably, the weight percentage of the tinting agent is from about 0.0001% to about 0.08%, more preferably, 0.0001% to about 0.05%. In one preferred embodiment, the tinting agent is present in an amount of from about 0.005 to 0.08 wt %. In one preferred embodiment, the weight percentage of the tint is from about 0.0001% to about 0.04%, more preferably, from about 0.0001% to about 0.03 wt % of the reactants.

In one preferred embodiment, the composition of the invention further comprises one or more UV blockers or UV absorbers. A UV absorber may be, for example, a strong UV absorber that exhibits relatively high absorption values in the UV-A range of about 320-380 nanometers, but is relatively transparent above about 380 nm. Preferably, the UV Blocker is a commercially available UV Blocker such as AEHB (acryloxyethoxy hydroxybenzophenone; $C_{10}H_{16}O_5$).

Generally speaking, a UV absorber, if present, is provided in an amount from about 0.5 wt % to about 1.5 wt % of the reactants. Particularly preferred are compositions which include from about 0.6 wt % to about 1.0 wt % UV absorber, more preferably, about 1.0 wt % of the reactants.

The above mentioned additives can also be incorporated into the lens product (xerogel) post polymerization during the hydration step where the appropriate quantity of the additive(s) have been dissolved in the saline that acts as a medium for the hydration.

Polydialkyl Siloxane Diol

According to one preferred embodiment, the composition of the present invention is prepared from at least one polydialkyl siloxane diol. Generally the polydialkyl siloxane diol comprises one or two terminal carbinol groups, typically two terminal carbinol groups.

The reaction of the invention involves reacting the OH groups of the polydialkyl siloxane diol and polyol component with isocyanate groups to form a polyurethane. Polydialkyl siloxanes are substantially hydrophobic, whereas the polyol component is substantially hydrophilic. In order to overcome any potential compatibility problems, the polydialkyl siloxane hydride terminated is first reacted with an allylpolyglycol in a hydrosilylation reaction to form a polydialkyl siloxane diol (also referred to hereinafter as the "silicone macromer") as follows:

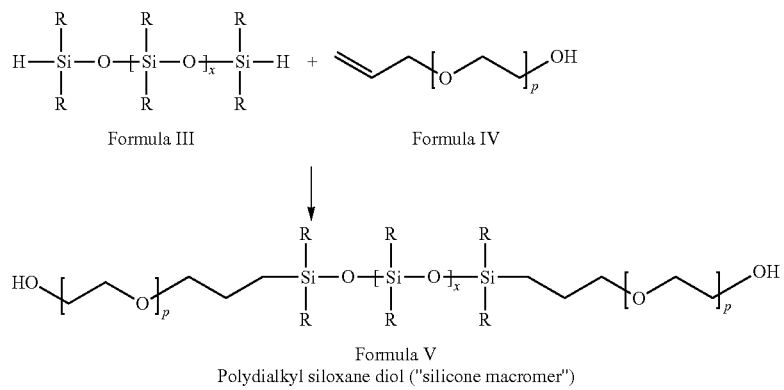

Formula III    Formula IV

Formula V
Polydialkyl siloxane diol ("silicone macromer")

where R is alkyl, p is an integer from 1 to 110 and x is an integer from 1 to 324.

Other allyl glycols may also be used in the above reaction instead of the compound of formula IV. For example, alternative reactants include the following:

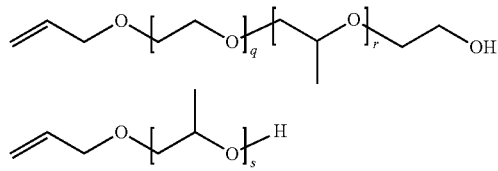

where q is an integer from 1 to 40, r is an integer from 1 to 10 and s is an integer from 1 to 25.

Preferably, the hydrosilylation is carried out in the presence of a catalyst. More preferably, the catalyst is a palladium catalyst. Even more preferably still, the palladium catalyst is platinum(0)-1,3-divinyl-1,1,3,3-tetramethyldisiloxane complex solution in xylene, Pt ~2%.

The hydrosilylation reaction changes the hydrophobic nature of the polydialkyl siloxane to a relatively hydrophilic reactive monomer with OH functional groups. This improves the compatibility with the other co-reactants in the reaction mixture.

In one particularly preferred embodiment, the polydialkyl siloxane is prepared by reacting polydimethyl siloxane hydride terminated (PDMS) with an allyl polyglycol such as polyethylene glycol monoallyl.

According to one embodiment, the polydialkyl siloxane diol comprises one or two terminal carbinol groups.

In particular, the polydialkyl siloxane diol may comprise a hydrocarbyl group between the siloxane group and the or each carbinol group. The hydrocarbyl group may be substituted or unsubstituted, typically with one or more small alkyl groups. Alternatively or additionally, the hydrocarbyl group may comprise one or more ether, or ester groups. Typically the hydrocarbyl group is unsubstituted. Alternatively, the hydrocarbyl group comprises an ether group. According to a further embodiment, the hydrocarbyl group comprises an ester group.

The hydrocarbyl group typically has a carbon backbone of 5 to 150 carbon atoms. According to one embodiment, the hydrocarbyl group is unsubstituted and has a carbon backbone of 1 to 10 carbon atoms, generally 1 to 5 carbon atoms, typically 3 to 5 carbon atoms.

Alternatively, the hydrocarbyl group comprises an ether group and has a carbon backbone of 5 to 50 carbon atoms, typically 5 to 40 carbon atoms.

According to a further embodiment, the hydrocarbyl group comprises an ester group and has a carbon backbone of 90 to 150 carbon atoms, typically 100 to 150 carbon atoms.

Generally the polydialkyl siloxane diol has a molecular weight of 500 to 10000, typically 1000 to 7000.

Typically the alkyl groups of the polydialkyl siloxane diol are small alkyl groups. According to one embodiment, the polydialkyl siloxane diol is a polydimethyl siloxane diol.

The term "Silicone Macromer" or "Carbinol terminated polydialkyl siloxane" is generally used to refer to a dihydroxy terminated block copolymer oxyethylene-dimethylsiloxane-oxyethylene (eg., formula V described in this document) or oxypropylene-dimethylsiloxane-oxypropylene oxide or caprolactone-dimethylsiloxane-caprolactone of different molecular weights containing different weight % of non-siloxane units. Some such compounds are also available commercially e.g., Gelest Inc. supplies compounds like DMS-C15 having a molecular weight of around 1000, and a non-siloxane content of around 20 wt %, DBE-C25 having a molecular weight of around 3500-4500, and a non-siloxane content of around 60 wt %}, DBP-C22 having a molecular weight of around 2500-3200, and a non-siloxane content of around 45-55 wt %, DBL-31 having a molecular weight of around 5700-6900, and a non-siloxane content of around 50 wt %.

The polydialkyl siloxane diol typically has the structure of Formula V

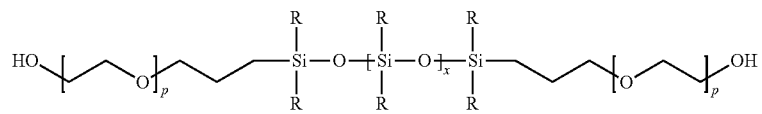

Alternatively the polydialkyl siloxane diol has the structure of Formula VI:

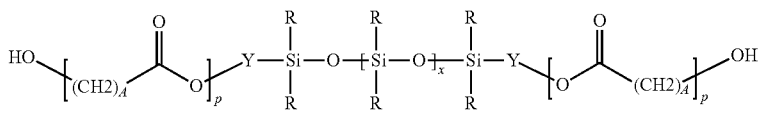

where R represents a small alkyl group, typically methyl, Y represents an alkyl group (generally having a carbon backbone of 1 to 25 carbon atoms, typically 1 to 6 carbon atoms), p is an integer from 1 to 110, x is an integer from 1 to 324 and A in an integer from 1 to 25, typically 1 to 10, generally 3 to 7, suitably 5.

According to one embodiment the polydialkyl siloxane diol has the structure of Formula V and has an associated molecular weight of 600 to 10000.

According to further embodiment, the polydialkyl siloxane diol has the structure of Formula VI and has a molecular weight of 5500 to 7000.

According to one embodiment, the polydialkyl siloxane diol is an oxyethylene-dimethylsiloxane-oxyethylene block polymer. Alternatively the polydialkyl siloxane diol is a oxypropylene-dimethylsiloxane-oxypropylene block copolymer. According to a further embodiment the polydialkyl siloxane diol is a caprolactone-dimethylsiloxane-caprolactone block copolymer.

The polydialkyl siloxane diol may comprise a mixture of more than one of the compounds described above. In particular, the polydialkyl siloxane diol may include more than one compound of Formula V and/or Formula VI having different molecular weights.

In one preferred embodiment, the polydialkyl siloxane diol is hydroxyethoxy-propyl terminated PDMS.

In one highly preferred embodiment, the polydialkyl siloxane diol is a polydimethyl siloxane diol, i.e. R is methyl in formula III.

Preferably, the starting polydialkyl siloxane dihydride terminated has a molecular weight of from about 200 to about 12,000, even more preferably, from about 500 to about 2000.

Preferably, the allylpolyglycol has a molecular weight of from about 200 to about 2000, even more preferably, from about 500 to about 1200.

In one particularly preferred embodiment, the silicone macromer is 2780 which is manufactured from allyl polyglycol 1100 and PDMS hydride terminated (MW=580).

In another particularly preferred embodiment, the silicone macromer is 1580 which is manufactured from allyl polyglycol 500 and PDMS hydride terminated (MW=580).

Similarly Carbinol (hydroxyl) terminated polydimethyl siloxanes such as copolymers of general architecture (oxyethylene)-(dimethylsiloxane)-(oxyethylene), (oxypropylene)-(dimethylsiloxane)-(oxypropylene) and (carpolactone)-(dimethylsiloxane)-(carpolactone) of different molecular weights and containing different non-siloxane content can be used. Any of these for simplicity may be referred to herein as the silicone macromer.

Catalysts may be used to speed up the polyurethane formulation and any of those catalysts normally used by those skilled in the art may be employed. For example, suitable catalysts normally dibutyltin dilaurate, stannous octoate, tertiary amines such as triethylamine and the like. In one highly preferred embodiment, the catalyst is dibutyl tin dilaurate (DBTDL).

Preferably, the catalyst is used in an amount of from about 0.02 wt % to about 1.0 wt % of the reactants, more preferably, from about 0.05 wt % to about 0.5 wt %, even more preferably, from about 0.05 wt % to about 0.2 wt %, of the reactants.

Process

Another aspect of the invention relates a process for preparing a polyurethane hydrogel, said process comprising:
(i) preparing a mixture comprising at least one polyol of formula I as defined above, at least one di- or poly-isocyanate and optionally at least one difunctional OH-terminated chain extender;
(ii) curing the mixture formed in step (i) directly to form a polyurethane xerogel;
(iii) hydrating the xerogel using an aqueous medium to form a hydrogel.

According to one embodiment, the mixture of step (i) also comprises one or more carbinol terminated polydialkyl siloxane diols.

Advantageously, the process of the invention involves curing the reactants in step (i) directly to form a polyurethane xerogel without the need for the addition of water as a reactant. This is in contrast to the prior art process described in U.S. Pat. No. 6,930,196.

Suitable OH-terminated chain extenders and di- or poly-isocyanates are as described above, in the amounts described above.

In one preferred embodiment, a catalyst is added to the mixture formed in step (i). Suitable catalysts (together with guidance as to the appropriate amount) are as described above. In one highly preferred embodiment, the catalyst is dibutyl tin dilaurate (DBTDL).

Additional components, such as modulus modifiers, plasticizers, humectants, lubricants, process aids, viscosity reducers, tinting agents, UV blockers, compatibility enhancers and/or polymer matrix structure modifiers as described above, may also be present in the reaction mixture. Optionally one or more of these additives can be incorporated into the product post polymerization step during the hydration stage by dissolving into the hydration medium.

For this embodiment of the invention, suitable polyols include those described above.

In one preferred embodiment of the invention the reactants in step (i) are mixed and dehydrated under vacuum. Preferably, the reactants are dehydrated under vacuum at a temperature of about 95° C. for at least 90 minutes.

In one preferred embodiment, the di- or poly-isocyanate is added to a mixture of the polyol and the difunctional OH-terminated chain extender.

Preferably, the reactants in step (i) are degassed under vacuum using a rotary evaporator.

A further aspect relates to a polymer obtainable by the process of the invention.

Yet another aspect relates to the use of a polymer according to the invention in the preparation of a contact lens.

Advantageously, the reactants in step (i) are cured directly to form a polyurethane xerogel without the need for a separate step to react with water.

Process for Preparing a Contact Lens

Another aspect of the invention relates to a process for preparing a contact lens, said process comprising the steps of:
(i) preparing a reaction mixture comprising at least one polyol of formula I as defined above, at least one di- or poly-isocyanate and optionally at least one difunctional OH-terminated chain extender;
(ii) dispensing the reaction mixture formed in step (i) into a contact lens mold;
(iii) allowing the reaction mixture to cure;
(iv) removing the contact lens from the mold; and
(v) hydrating the contact lens.

According to one embodiment, the mixture of step (i) also comprises one or more carbinol terminated polydialkyl siloxane diols.

In one preferred embodiment, the reactants in step (i) are dispensed into a female lens mold and the male part of the lens mold is then placed over the liquid contained in the female part and subsequently closed optionally by a machine.

In one preferred embodiment, the molds are placed in an oven and allowed to cure. Preferably, the molds are allowed to cure at a temperature of from about 70° C. to about 10° C., more preferably, from about 85° C. to about 95° C. In one highly preferred embodiment, the molds are allowed to cure at a temperature of least 95° C.

Preferably, the molds are allowed to cure for about 0.5 to about 24 hours, more preferably, for about 3 to about 12 hours. Even more preferably, the molds are allowed to cure for at least about 5 hours to about 12 hours, more preferably for about 8 hours. Optionally the curing can also be done in the oven under a dry nitrogen flow.

Preferably, the molds are removed from the oven and allowed to cool to ambient temperature and lenses are demolded.

In one preferred embodiment, after step (iii), the mold is cooled to a temperature of from about −30° C. to about −120° C. prior to removing the contact lens from the mold. Preferably, the molds are chilled in a freezer. More preferably, still, the molds are chilled to a temperature of from about −50° C. to about −90° C., even more preferably from about −60° C. to about −90° C. More preferably still, the molds are chilled to a temperature of about −80° C. Preferably, the molds are chilled for at least 30 minutes, more preferably, at least 60 minutes. In one especially preferred embodiment, the lenses are chilled for at least 20 minutes.

Advantageously, the cooling process allows the polymer chains to attain a temperature below the glass transition that shrinks the polymer matrix/material and reduces the interaction at the interface which enhances the demolding of the lens product.

The lenses are then preferably demolded from the molds by separating the male and female parts. Preferably, the lenses are hydrated by immersing in saline solution.

Alternatively, in another preferred embodiment in particular where PEG DME has been used in the formulation, the lens molds are physically separated (at ambient temperature) and the part containing the lense is immersed in excess of saline for 5-150 minutes, more preferably for 60-90 minutes, more preferably still for 30-60 minutes, to demold the lens.

Article of Manufacture

Another aspect of the invention relates to an article of manufacture comprising a polymer as described above.

Preferably, the article of manufacture is in the form of a contact lens.

A contact lens must be permeable to oxygen in order for the lens to facilitate normal corneal metabolism. Preferably, contact lenses prepared using the polymer composition of the invention exhibit a DK value of a least 10 Barrer more preferably, at least 20, even more preferably, at least 30 Barrer. More preferably still, the lenses have a DK of about 40 Barrer.

In one preferred embodiment, the lenses have a DK of about 15 to about 40 Barrer more preferably, from about 25 to about 40 or more Barrer.

A contact lens must be able to transmit light in the visible region in order to function effectively in correcting visual defects. Preferably, contact lenses prepared using the polymer composition of the invention exhibit a light transmissibility of at least 80%, more preferably at least 90%, even more preferably, at least 95% or 97%. Preferably, the light transmissibility is from about 90 to about 100%, more preferably from about 95 to about 100%, more preferably still, 100%.

Preferably, contact lenses prepared using the polymer composition of the invention exhibit a modulus of from about 0.1 to about 1.25 MPa, more preferably from about 0.25 to about 0.75 MPa.

The modulus of a contact lens plays a key role in controlling the mechanical properties of a soft contact lens. In addition, the on-eye performance is directly effected by the modulus. A value of greater than 1.25 MPa is likely to cause corneal staining whilst a modulus below 0.1 MPa is likely to lead to a lens with poor handling properties.

Preferably, contact lenses prepared using the polymer composition of the invention have a water content of 10 to about 90 weight ° A), more preferably, from about 20 to about 80 weight %, more preferably, from about 25 to about 75 weight %, even more preferably, from about 30 to about 70 weight %, more preferably still, from about 40 to about 70 weight %.

The equilibrium water content of the lens is a function of the material properties and plays a key role in determining the bulk, mechanical and physical properties of the lens. Water provides the medium to transmit oxygen and with the modulus governs the on eye properties of the lens.

The present invention is further described with reference to the following non-limiting examples.

EXAMPLES

Example A

Preparation of Silicone Macromer

The components and actual weights are defined below:
Polydimethylsiloxane hydride terminated (Aldrich 423785)
Polyethylene glycol monoallyl (Polyglycol A500 Clariant)
Platinum(0)-1,3-divinyl-1,1,3,3-tetramethyldisiloxane complex solution in
xylene, Pt ~2%) Aldrich 479519) (platinum catalyst)

20.050 g of polydimethylsiloxane hydride terminated was added into a three-neck flask (under dry nitrogen flow) and placed in an oil bath. The platinum catalyst was then added. When the temperature of the contents was 50° C., the polyethylene glycol monoallyl was added dropwise through a syringe needle over a period of fifty minutes while the contents of the flask were stirred with a magnetic stirrer. The temperature of the reaction mixture rose to and was maintained at 65° C. After the addition of the monoallyl polyethylene glycol the reaction temperature was maintained at 65° C. and the reaction was allowed to continue for a further 2 hours. After this time the flask was lifted out of oil bath and left to cool to ambient temperature.

Preparation of Polyurethane Polymer

The required quantities of the reactants and additives described in Tables 1, 2 and 3, namely, P41/300 or related macropolyols, where appropriate PEG s (Clariant GmbH), where appropriate MPD(Kuraray GmbH), TEG (Sigma-Aldrich Ltd), where appropriate silicone macromer (prepared within our laboratories or sourced from Fluorochem, UK), where appropriate TMP (Sigma-Aldrich), where appropriate PEG DME (Sigma-Aldrich), BHA (Sigma-Aldrich), where appropriate Reactive Blue 4 (Sigma-Aldrich) and UV Blocker (AEHB, CAS Number 16432-81-8; Contamac Ltd), were accurately weighed into a round bottom Quickfit flask using a 4-place balance and stoppered. The contents after mixing were dehydrated under vacuum at 95° C. for at least 90 minutes using a Buchi rotary evaporator.

The flask was lifted out of the oil bath and allowed to cool down to ambient temperature. Once cooled, the required amount of the catalyst (DBTDL, Sigma-Aldrich) was added through a needled syringe (by the difference of weight of the syringe containing DBTDL before and after the addition to the flask containing the dehydrated components). The flask was quickly stoppered and shaken. Finally the appropriate quantity of Desmodur W (Bayer; supplied by Atlas Polymers Ltd UK) was added into the flask (by the weight difference of a syringe containing the required amount of the Desmodur W) in a fume hood. Optionally the order of mixing the catalyst and Desmodur W can also be reversed for convenience of better mixing and subsequent dispensing into the molds. The contents of the flask were mixed vigorously (ensuring the flask remains stoppered) and quickly degassed under vacuum for ~1 minute using a rotary evaporator (without using oil bath) to eliminate/reduce the bubbles. The mixture was then dispensed into female polypropylene lens molds (20 to 55 microliter per lens as appropriate for a given mold variety). The male part of the lens mold was then placed carefully over the liquid contained in the female part and subsequently closed using a machine appropriately preset for the mold type used. This operation was repeated until all the lens molds were closed. These molds were then placed in a tray, put in an oven set at 95° C. and allowed to cure for up to 22 hours more preferably for 8 hours. Optionally, the curing can be done under dry nitrogen. The molds were then removed from the oven, allowed to cool to ambient temperature and chilled in a freezer (set at −80° C.) for at least 20 minutes. The lenses were demolded from the molds by separating the male and female parts and subsequently immersing in saline contained in glass vials.

The contact lenses thus produced can be sterilized by conventional steam sterilization or may be sterilised by other methods including UV sterilisation technique.

Water Content

Water content is calculated after measurement of dry weight and hydrated weight of a lens by using the following equation:

$$\text{Water Content (\%)}=(W_{hydrated\ lens}-W_{dry\ lens})/W_{hydrated\ lens}\times 100$$

Five hydrated lenses, with excess surface water removed, are separately weighed on an analytical balance and average value is taken as $W_{hydrated\ lens}$. The lenses are then dried in an oven at 75° C. for 2 hours and weighed again separately. The average value is taken as $W_{dry\ lens}$.

% Transmittance

% Transmittance was determined under the guidance of ISO 8599 by using a double beam UV spectrophotometer (Jasco V530). A lens is placed into a cuvette containing standard saline solution. The cuvette is placed in the sample compartment. A matching cuvette containing saline is placed in the reference compartment of the UV spectrophotometer and a spectrum as percent transmittance was recorded between 200-780 nm. The test was repeated a further four times and the mean value (% transmittance) at 550 nm was recorded.

The contact lenses thus produced can be steam sterilized by a conventional method or may be sterilized by a UV sterilisation technique described below:

The contact lenses are separately placed in polypropylene lens mold (female part) containing saline. These are then sealed by a foil using a heat sealing unit and placed in an inverted position so that the polypropylene (which is UV transparent) part of the molds are facing the UV light source in the sterilisation unit XeMaticA-IL-SA (ex Steribeam, Germany). The product is then subjected to multiple short (250 micro second) pulses of high intensity ultraviolet rich light. This process renders the product sterilized.

DK Measurement

DK Measurement (i.e., oxygen permeability) was carried out by the polarographic technique as briefly described below:

Ten lenses were placed into the Gallenkamp incubator set at 35+/−0.5° C. for 24 hours. The centre thickness (CT) of each of the ten lenses were measured by Rehder ET-3 Electronic Thickness Gauge and these lenses were stacked as follows: A single lens stack, two lens stack, three lens stack, and four lens stack. The CT of each stack was measured three times and a mean value for each was calculated and fed into a spread sheet specifically developed for the method. Also recorded was the atmospheric pressure into the spread sheet. The stack of lenses were replaced into the incubator set at 35+/−0.5° C. and humidity >98%.

Each stack was separately placed on to the electrode (Rehder Permeometer with 8.7 mm electrode) ensuring that there are no bubbles entrapped between the lenses and the electrode. When the current reached its lowest point the reading was recorded in the relevant section of the spead sheet. This test was repeated for all the stacks.

The dark current reading (background) of the measurement system, when no oxygen is able to pass through to the electrode, was recorded and subtracted from all test material current values. Data was analysed taking into consideration the partial pressure of oxygen and the surface area of the polarographic sensor used and finally corrected for the edge effect. A graph of Dk/t corr verses thickness (cm) was then plotted and the inverse of the gradient of the best fit taken to represent the permeability (DK) of the lens material.

Modulus Data

Modulus data was measured for contact lenses prepared in accordance with the invention by tensile testing using the Instron 5842 Tensile testing system with Merlin Software & following Quality System placed in house that conform to Standards/Regulation:ISO 9001:2008 (Quality Standards: Par 7.6; ISO 13485:2003 Medical Device Directive: Par 7.6; FDA Part 820 QS Regulation Subpart G: Control of inspection, monitoring and test equipment 820.72.

Process (Material Preparation)

Thickness readings for each lens were obtained using the ET-3 Thickness gauge. The lenses were placed flat on the cutting mat and two long pieces were cut from around the centre of the flat lens using a razor blade. These cut pieces were put into saline solution in a sample dish. The sample was loaded on to clamps using tweezers carefully going for the top clamp first and then the bottom. The gap in between the clamps was set at 10 mm using a calibrated vernier caliper. Once set, the "Reset GL" button was pressed to set the Gauge Length". Once the sample was loaded, the balance load was set to 0.000N and the test was started using the console controls.

Table 1 shows examples of the presently claimed PEG-RCM compositions where the reactive mixture was dispensed at room temperature into cold polypropylene molds cold liquid dispensed (CLD). The Examples summarized in Table 1 do not contain any silicone macromer.

Examples 1-4 indicates the use of different levels of catalyst(dbtdl) concentration.

Examples 5-8 indicates the use of different levels of triethylene glycol (TEG).

Examples 9-10 indicates the use of different levels of PEG DME 250 and Reactive Blue 4.

Example 11 indicates the use of a UV blocker.

Example 12 indicates various properties of the lens material afforded by this composition.

Comparison of examples 2, 3 and 9-11 show that by using PEG DME in the formulation, the modulus of the lens (material) can be reduced and hence the level of PEG DME can be adjusted to obtain the required value of modulus.

The chilling before demolding allows low Tg materials such as the materials of the current invention to demold easily.

Table 2 shows examples of the presently claimed PEG-Si-RCM compositions where the reactive mixture was dispensed at room temperature into cold polypropylene molds cold liquid dispensed (CLD).

Examples 13-15 (in Table 2) indicate the use of PEG DME and show that the modulus can be modified by varying the amount of PEG DME.

Examples 14-15 (in Table 2) show that changing the stoichiometry (i.e. using a slightly higher amount of Desmodur W) increases the degree of crosslinking, hence the modulus of lens/material will increase.

Examples 16-17 (in Table 2) indicate that use of higher amounts of the silicone macromer, and other PEG DMEs, and their effects on reducing the modulus.

Table 3 shows presently claimed PEG-Si-RCM compositions where the reactive mixture contained Silicone Macromer DBE-C25).

Examples 18-24 (in Table3) show that polyethylene glycols of different molecular weights individually or in combination can also be used in with the Silicone macromer.

Examples 6 shows that a UV blocker and handling tint can be incorporated into the lens.

Various modifications and variations of the described aspects of the invention will be apparent to those skilled in the art without departing from the scope and spirit of the invention. Although the invention has been described in connection with specific preferred embodiments, it should be understood that the invention as claimed should not be unduly limited to such specific embodiments. Indeed, various modifications of the described modes of carrying out the invention which are obvious to those skilled in the relevant fields are intended to be within the scope of the following claims.

TABLE 1

Selected compositions according to the invention

| Example | Wt of P41/300 (g) | Wt of TEG (g) | Wt.of Desmodur W(g) | Wt. of DBTDL (g) | Wt of BHA (g) | Wt of PEG DME 250 (g) | Wt of AEHB (UV Blocker) (g) | Reactive blue 4 (g) | Modulus (MPa) | DK (Barrer) | Water content (%) | Transmittance at 550 nm (%) |
|---|---|---|---|---|---|---|---|---|---|---|---|---|
| 1 | 20.4670 | 3.0450 | 6.845 | 0.0154 | 0.3029 | 0 | 0 | | | | | |
| 2 | 20.0350 | 3.0114 | 6.880 | 0.0177 | 0.2991 | 0 | 0 | | 1.29 | | | |
| 3 | 20.0009 | 3.0075 | 6.845 | 0.0344 | 0.3021 | | | | 1.34 | | | |
| 4 | 20.0650 | 3.0176 | 6.797 | 0.0135 | 0.3000 | 0 | 0 | | | | | |
| 5 | 30.0175 | 0 | 2.392 | 0.0056 | 0.3237 | 0 | 0 | | | | | |
| 6 | 20.0247 | 1.9343 | 4.954 | 0.0168 | 0.2656 | 0 | 0 | | | | | |
| 7 | 20.0813 | 6.0122 | 12.536 | 0.0190 | 0.3876 | 0 | 0 | | | | | |
| 8 | 20.0813 | 10.2399 | 19.503 | 0.0305 | 0.4931 | 0 | 0 | | | | | |
| 9 | 45.6007 | 6.8557 | 15.520 | 0.0331 | 0.3009 | 1.5707 | 0 | 0.0093 | 0.48 +/− 0.13 | | | |
| 10 | 20.0070 | 3.0510 | 6.846 | 0.0128 | 0.2980 | 1.4906 | 0 | 0.0094 | 0.37 +/− 0.21 | | | |
| 11 | 19.9993 | 3.0129 | 6.832 | 0.0179 | 0.2982 | 1.4961 | 0.2983 | 0.0087 | 0.48 | | | |
| 12 | 20.0000 | 3.0034 | 7.455 | 0.0305 | 0.3050 | 1.9798 | 0 | 0.0089 | 0.82 +/− 0.05 | 33 | 59.5 | 95.5 |

TABLE 2

Selected compositions according to the invention

| Example | Wt of P41/300 (g) | Wt of Si Macromer (g) | Wt of TEG (g) | Weight of Desmodur W (g) | Weight of DBTDL (g) | Wt of BHA (g) | Wt of PEG-DME 250 (g) | Wt of AEHB9UV Blocker) (g) | Reactive blue 4 (g) | Modulus (MPa) |
|---|---|---|---|---|---|---|---|---|---|---|
| 12 | 10.0019 | 0.3163 | 1.5179 | 3.698 | 0.025 | 0.1552 | 0 | 0 | 0 | 1.7 +/− 0.14 |
| 13 | 10.0003 | 0.3177 | 1.5168 | 3.478 | 0.0159 | 0.1529 | 0.7769 | 0 | 0.0040 | 0.76 +/− 0.19 |
| 14 | 10.0731 | 0.3263 | 1.5117 | 3.515 | 0.0175 | 0.1647 | 0.920 | 0 | 0.0042 | 0.4 +/− 0.14 |
| 15 | 10.0386 | 0.3160 | 1.5232 | 3.731 | 0.0136 | 0.1529 | 0.9203 | 0 | 0.0055 | 0.73 +/− 0.18 |
| 16 | 10.0016 | 3.1952 | 6.0321 | 11.843 | 0.0248 | 0.3123 | 0 | 0 | 0.0092 | 0.59 +/− 0.19 |
| 17 | 10.0335 | 3.1754 | 6.0269 | 11.815 | 0.0282 | 0.3065 | PEG-DME1000 1.5516 | 0 | 0.0092 | 0.39 +/− 0.18 |

TABLE 3

Selected compositions according to the invention (Using Silicone Macromer DBE-C25)

| Example | Wt of PEG 3350 (g) | Wt of PEG600 (g) | MPD (g) | TMP (g) | Wt of Si Macromer DBE-C25 (g) | Wt of TEG (g) | Weight of Desmodur W (g) | Weight of DBTDL (g) | Wt of BHA (g) | Wt of AEHB9 UV Blocker (g) | Reactive blue 4 (g) | Modulus (MPa) | EWC (%) | DK (Barrer) |
|---|---|---|---|---|---|---|---|---|---|---|---|---|---|---|
| 18 | 4.9907 | 4.7777 | 0.1841 | 0.1207 | 17.9334 | 2.7602 | 9.370 | 0.1173 | 0.4827 | | | | | 33.2 |
| 19 | 4.9999 | 4.4850 | 0.2015 | 0.2002 | 20.9144 | 5.4062 | 14.886 | 0.1502 | 0.4807 | | | | 50.2 | 34.63 |
| 20 | | 2.2333 | 0.0878 | 0.1004 | 23.8876 | 2.6913 | 8.359 | 0.1098 | 0.3712 | | | | 50.0 | 26.88 |
| 21 | | 2.6837 | 0.0920 | 0.2565 | 23.8220 | 2.6837 | 8.416 | 0.1106 | 0.3913 | | | | 46.9 | 43.42 |
| 22 | 5.0126 | | | 0.6039 | 23.8741 | 6.7359 | 16.261 | 0.1581 | 0.5206 | | | 0.25 | 40.62 | 23.36 |
| 23 | | 2.2738 | 0.1590 | 0.2095 | 23.9977 | 5.3805 | 13.399 | 0.1380 | 0.4813 | 0.4525 | 0.0127 | | 25.2 | |
| 24 | 5.0126 | | | 0.6039 | 23.8741 | 0.7359 | 16.261 | 0.1501 | 0.5206 | | | | | |

Where MPD = 3 methyl 1,5 pentane diol (ex Kuraray Europe GMBH)
All compositions afforded transparent lenses indicating compatibility

The invention claimed is:
1. A contact lens prepared by
   i. reacting a mixture comprising:
      (a) 30 to 70 wt % of at least one polyol of formula I,

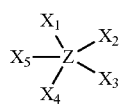
I wherein at least three of $X_1$, $X_2$, $X_3$, $X_4$ and $X_5$ are each independently an OH-terminated polyoxyalkylene group, and the remainder of $X_1$, $X_2$, $X_3$, $X_4$ and $X_5$ are each independently H or absent, and Z is a central linking unit;
      (b) a polydialkyl siloxane diol;
      (c) 9 to 50 wt % of at least one di- or poly-isocyanate; and
      (d) 10 to 25 wt % of at least one OH-terminated chain extender comprising two hydroxyl groups, having a molecular weight of 1000 or less;
   wherein the mixture comprises less than 0.3 wt % water;
   (ii) curing the mixture formed in step (i) directly to form a polyurethane xerogel; and
   (iii) hydrating the xerogel using an aqueous medium to form a hydrogel.
2. A contact lens according to claim 1 wherein the polyol is a macropolyol of formula Ia,

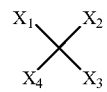
Ia wherein each of $X_1$, $X_2$ and $X_3$ is independently an OH-terminated polyoxyalkylene group, wherein each polyoxyalkylene group is a polymer and/or copolymer of ethylene oxide and propylene oxide;
and $X_4$ is H or as defined for $X_1$, $X_2$ and $X_3$.
3. A contact lens according to claim 1 wherein the polyol is a macropolyol of formula Ib,

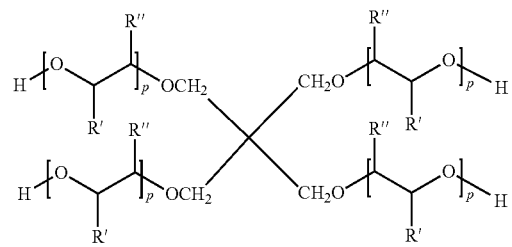
Ib wherein each p is independently from about 3 to about 25; and each of R' and R" is independently H or alkyl.
4. A contact lens according to claim 1 wherein the polyol is a macropolyol of formula Ic,

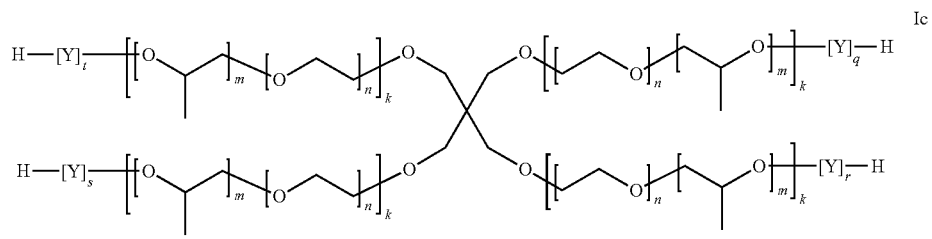
Ic wherein Y is the group —CH₂—CH(R')—O—, R' is H or CH₃, n is an integer from 0 to 20, m is an integer from 0 to 6, k is an integer from 3 to 25 and each of q, r, s and t is independently an integer from 1 to 25.

5. A contact lens according to claim 1 wherein the polyol comprises silicon.

6. A contact lens according to claim 1 wherein the macropolyol has a molecular weight of from about 500 to about 20,000.

7. A contact lens according claim 1 wherein the di- or poly-isocyanate is selected from methylene bis (4-cyclohexyl isocyanate), 2,4,6-toluene triisocyanate, trifunctional trimer (isocyanurate) of isophorone diisocyanate, trifunctional trimer (isocyanurate) of hexamethylene diisocyanate and polymeric 4,4'diphenylmethane diisocyanate, methylene dicyclohexyl diisocyanate, hexamethylene diisocyanate, isophorone diisocyanate, toluene-2,4-diisocyanates, toluene-2,6-diisocyanate, mixtures of toluene-2,4 and 2,6-diisocyanates, ethylene diisocyanate, ethylidene diisocyanate, propylene-1,2-diisocyanate, cyclohexylene-1,2-diisocyanate, cyclohexylene-1,4-diisocyanate, m-phenylene diisocyanate, 3,3"-diphenylene-4,4"-biphenylene diisocyanate, 4,4"-biphenylene diisocyanate, 1,6-hexamethylene diisocyanate, 1,4-tetramethylene diisocyanate, 1,10-decamethylene diisocyanate, cumene-2,4-diisocyanate, 1,5-naphthalene diisocyanate, 1,4-cyclohexylene diisocyanate, 2,5-fluorenediisocyanate and polymeric 4,4'diphenylmethane diisocyanate.

8. A contact lens according to claim 1 wherein the chain extender is selected from polyethylene glycols and/or polypropylene glycols or glycols comprising copolymers of ethylene oxide and propylene oxide, triethylene glycol, 1,4-butanediol, tetraethylene glycol, diethylene glycol, ethylene glycol, hexanediol, propylene glycol, 2-ethylhexanediol-1,6, neopentyl glycol hydroquinone bis(2-hydroxyethyl) ether, dipropylene glycol, 2-methyl-2-ethyl-1,3-propanediol, 2-ethyl-1,3-hexanediol, 1,5-pentanediol, thiodiglycol, 1,3-propanediol, 1,3-butanediol, 2,3-butanediol, 1,2-dimethyl-1,2-cyclopentanediol, 1,2-cyclohexanediol, 1,2-dimethyl-1,2-cyclohexanediol, glycerol, trimethylol propane, trimethylol ethane, 1,2,6-hexanetriol, anhydroaneaheptitol, mannitol, sortbitol, methylglucoside and bis-1,4(β-hydroxyethoxy)benzene.

9. A contact lens according to claim 1 wherein the mixture further comprises a catalyst.

10. A contact lens according to claim 9 wherein the catalyst is a transition metal catalyst, an amine or a polyamine.

11. A contact lens according to claim 10 wherein the catalyst is selected from tributyltin dilaurate, FeCl₃, stannous octoate, and triethylamine.

12. A contact lens according to claim 1 wherein the mixture further comprises one or more antioxidants.

13. A contact lens according to claim 12 wherein the mixture comprises 1 to 3 wt % antioxidant.

14. A contact lens according to claim 1 wherein the mixture further comprises one or more tinting agents.

15. A contact lens according to claim 1 wherein the mixture further comprises one or more UV blockers.

16. A contact lens according to claim 1 wherein the mixture further comprises one or more of a modulus modifier, a plasticizer, a humectant and a lubricant.

17. A contact lens according to claim 16 wherein the modulus modifier is poly(ethylene glycol) dimethyl ether.

18. A contact lens according to claim 1 wherein the polydialkyl siloxane diol is of formula V,

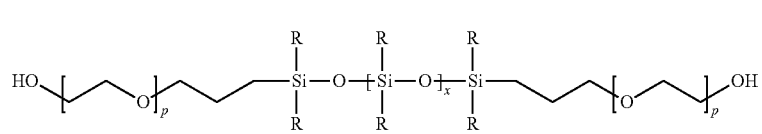

Formula V wherein R is alkyl, p is an integer from 1 to 46 and x is an integer from 1 to 324.

19. A contact lens according to claim 18 wherein the polydialkyl siloxane diol of formula V is prepared by reacting a polydialkyl siloxane dihydride terminated of formula III with an allyl polyglycol of formula IV:

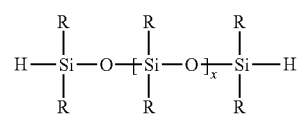

Formula III

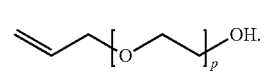

Formula IV

20. A contact lens according to claim 1 wherein the polydialkyl siloxane diol has the structure of Formula VI:

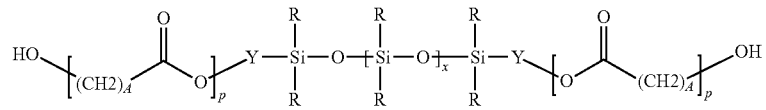

wherein R is a small alkyl group, Y is an alkyl group, p is an integer from 1 to 110, x is an integer from 1 to 324, and A is an integer from 1 to 25.

21. An article of manufacture comprising a contact lens according to claim 1.

* * * * *